Patented Jan. 21, 1947

2,414,655

UNITED STATES PATENT OFFICE 2,414,655

MANUFACTURE OF CYANURIC CHLORIDE

Thomas Pounder Metcalfe, Blackley, Manchester, England, assignor to Imperial Chemical Industries Limited, a corporation of Great Britain No Drawing. Application May 17, 1944, Serial No. 536,044. In Great Britain June 7, 1943

6 Claims. (Cl. 260—248)

This invention relates to an improved process for the manfacture of cyanuric chloride.

According to this invention, cyanuric chloride is manufactured by the process which comprises polymerising gaseous cyanogen chloride in the presence of anhydrous aluminium chloride and in the absence of other solvent or diluent, and then removing the cyanuric chloride from the polymerisation mass by vaporisation, if desired, with the assistance of air or other inert gas. In carrying out the invention, it is convenient to begin by bringing the gaseous cyanogen chloride into contact with the solid aluminium chloride. Polymerisation takes place at the surface of the solid, the heat of the reaction keeps the resulting polymer liquid, aluminium chloride dissolves in the liquid and the cyanogen chloride can then be passed into the solution. The heat of the reaction is sufficient to maintain a temperature high enough for rapid reaction, and to keep the reaction mass fluid, but for uniform working it is convenient to maintain the temperature within a constant range, e. g., 165–175° C., by controlling the rate of absorption of the cyanogen chloride and/or by external heating or cooling as necessary. 1 part of aluminium chloride can be used satisfactorily with about 8 parts of cyanogen chloride. The cyanuric chloride is conveniently removed after polymerisation by passing a current of dry air through the polymerisation mass while it is maintained at a temperature of 180–200° C. The product is of excellent purity.

Friedel and Crafts, Annales de Chimie et de physique 1884, 6 I. 528–9, refer to the formation of cyanuric chloride together with other products such as benzonitrile when cyanogen chloride is passed into warm benzene containing aluminium chloride, but they did not isolate the cyanuric chloride.

It is also known to treat cyanogen halides with the chlorides of antimony, boron, iron and titanium to yield complexes containing cyanuric chloride but none of these treatments have been described as of value for the manufacture of cyanuric chloride.

The two most useful methods which are known for making cyanuric chloride are (1) passing chlorine into a solution of anhydrous hydrogen cyanide in chloroform (Ber. der. duet. chem. Ges., 32, 692) and (2) saturating an ether solution of cyanogen chloride with dry hydrogen chloride (Ber. der. deut. chem. Ges., 28, 2472).

The process of the present invention has many advantages over the above methods. Thus, it needs no organic solvent and avoids the difficulties of recovering solvents containing dissolved volatile toxic compounds. It also avoids the use or formation of large quantities of hydrogen chloride, the presence of which would necessitate special manufacturing plant. Also the product is obtained in a pure form.

The following examples, in which the parts are by weight, illustrate but do not limit the invention.

Example 1

100 parts of anhydrous aluminium chloride in lump form in a closed reaction vessel are heated cautiously to about 100° C., and a slow stream of cyanogen chloride gas then passed over them. Liquid cyanuric chloride forms on the surface of the aluminium chloride, aluminium chloride dissolves in this liquid, the solution collects in the bottom of the vessel and the cyanogen chloride gas inlet tube is then adjusted so that the gas passes into the liquid. At the same time the temperature is adjusted to and kept at 165–170° C. by external heating or cooling as necessary. As the volume of the liquid increases, the gas stream is increased to 400–500 parts per hour and kept at this until catalytic activity begins to fall, which may be after about an hour, whereupon the gas stream is reduced accordingly. A total of about 800 parts of cyanogen chloride can be absorbed before the catalytic activity falls considerably, and when this does take place polymerisation should advisedly be stopped.

After stopping the polymerisation, the cyanogen chloride gas is replaced by a stream of air and the temperature adjusted to 180–200° C. Cyanuric chloride sublimes in the stream of air and is collected in a receiver. Towards the end of the sublimation the temperature is raised to 220° C. and the air stream increased so as to remove as much cyanuric chloride as possible from the residual viscous liquid. The cyanuric chloride so obtained is a white crystalline solid, which melts at 146° C. and does not fume in air or leave a residue on evaporation.

Example 2

This example is similar to Example 1, except that polymerisation and sublimation are effected simultaneously in the latter part of the process.

As in Example 1, cyanogen chloride gas is passed over anhydrous aluminium chloride first at about 100° C. and then at 165–170° C. This latter range is maintained until all the aluminium chloride is in solution, when the temperature is raised to 180–200° C. The stream of cyanogen chloride gas is maintained and a stream of air is passed in at the same time by a separate inlet tube. The two gas streams can be regulated so as to keep the temperature at 180–200° C. and to keep the volume of the liquid constant.

I claim:

1. The process for the manufacture of cyanuric chloride which comprises passing a stream of gaseous cyanogen chloride into contact with substantially anhydrous aluminum chloride dissolved in liquid cyanuric chloride in the absence of other solvent.

2. The process for the manufacture of cyanuric chloride which comprises passing a stream of gaseous cyanogen chloride into liquid cyanuric chloride containing substantially anhydrous aluminum chloride dissolved therein in the absence of other solvent.

3. The process for the manufacture of cyanuric chloride which comprises passing a stream of gaseous cyanogen chloride into substantially pure liquid cyanuric chloride containing substantially anhydrous aluminum chloride dissolved therein, and recovering purified cyanuric chloride by passing a stream of substantially inert gas through said liquid cyanuric chloride and cooling the cyanuric vapor appearing in the effluent gas stream to form a cyanuric chloride sublimate.

4. The process for the manufacture of cyanuric chloride which comprises passing a stream of gaseous cyanogen chloride into contact with substantially anhydrous aluminum chloride at a temperature of about 100 to 200° C. until a solution of said aluminum chloride in liquid cyanuric chloride is formed, then passing gaseous cyanogen chloride into said solution and passing a substantially inert gas through said solution so as to cause evaporation of cyanuric chloride therefrom and cooling the effluent gas to form a cyanuric chloride sublimate said liquid cyanuric chloride being the sole reaction solvent.

5. The process for the manufacture of cyanuric chloride which comprises passing a stream of gaseous cyanogen chloride into contact with substantially anhydrous aluminum chloride at a temperature of about 100 to 170° C. until a solution of said aluminum chloride in liquid cyanuric chloride is formed, passing cyanogen chloride into said solution at a temperature of about 165 to 175° C., thereafter passing air through said solution at a temperature of about 180 to 220° C. and cooling the effluent air sufficiently to obtain therefrom a cyanuric chloride sublimate said liquid cyanuric chloride being the sole reaction solvent.

6. The process for the manufacture of cyanuric chloride which comprises passing a stream of gaseous cyanogen chloride into contact with substantially anhydrous aluminum chloride at a temperature of about 100 to 170° C. until a solution of said aluminum chloride in liquid cyanuric chloride is formed, passing cyanogen chloride and air in separate streams into said solution at a temperature of about 180 to 200° C. and cooling the effluent air sufficiently to obtain therefrom a cyanuric chloride sublimate said liquid cyanuric chloride being the sole reaction solvent.

THOMAS POUNDER METCALFE.